United States Patent
Miura et al.

(10) Patent No.: US 9,425,698 B2
(45) Date of Patent: Aug. 23, 2016

(54) POWER CONVERSION APPARATUS AND METHOD

(71) Applicant: TOYOTA JIDOSHA KABUSHIKI KAISHA, Toyota-shiAichi-ken (JP)

(72) Inventors: Mitsuhiro Miura, Toyota (JP); Naoto Hasegawa, Seto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 112 days.

(21) Appl. No.: 14/570,438

(22) Filed: Dec. 15, 2014

(65) Prior Publication Data

US 2015/0180358 A1 Jun. 25, 2015

(30) Foreign Application Priority Data

Dec. 24, 2013 (JP) ................. 2013-265638

(51) Int. Cl.
*H02M 1/088* (2006.01)
*H02M 3/335* (2006.01)
*H02M 1/00* (2006.01)
*H02M 7/5387* (2007.01)

(52) U.S. Cl.
CPC ...... *H02M 3/33546* (2013.01); *H02M 3/33584* (2013.01); *H02M 2001/0048* (2013.01); *H02M 2007/53878* (2013.01)

(58) Field of Classification Search
CPC ............ H02M 1/088; H02M 3/33507; H02M 3/33592
USPC ........................ 363/17, 65, 89, 98
See application file for complete search history.

(56) References Cited

U.S. PATENT DOCUMENTS

| | | | |
|---|---|---|---|
| 2004/0046535 A1 | 3/2004 | Duffy et al. | |
| 2010/0164454 A1 | 7/2010 | Rinne et al. | |
| 2011/0198933 A1 | 8/2011 | Ishigaki et al. | |
| 2012/0112720 A1 | 5/2012 | Remmert | |
| 2014/0346871 A1* | 11/2014 | Hirano | H02M 3/33584 307/24 |
| 2014/0347889 A1* | 11/2014 | Muto | H02M 3/33584 363/17 |
| 2014/0347890 A1* | 11/2014 | Hirano | H02M 3/33561 363/17 |
| 2014/0347891 A1* | 11/2014 | Muto | H02M 3/33561 363/17 |
| 2014/0347892 A1* | 11/2014 | Muto | H02M 3/33584 363/17 |

(Continued)

FOREIGN PATENT DOCUMENTS

| | | |
|---|---|---|
| AT | 509828 A1 | 11/2011 |
| DE | 10349696 A1 | 5/2004 |

(Continued)

*Primary Examiner* — Jeffrey Sterrett
(74) *Attorney, Agent, or Firm* — Sughrue Mion, PLLC

(57) ABSTRACT

A power conversion apparatus includes: a primary side full bridge circuit having a first arm circuit and a second arm circuit in parallel, a secondary side full bridge circuit having a third arm circuit and a fourth arm circuit in parallel, and a control unit configured to adjust a first phase difference between switching of the first arm circuit and switching of the third arm circuit and a second phase difference between switching of the second arm circuit and switching of the fourth arm circuit to control transmitted power that is transmitted between the primary side full bridge circuit and the secondary side full bridge circuit, wherein the control unit, among the first phase difference and the second phase difference, causes the phase difference between arm circuits having a higher efficiency to be larger than the phase difference between arm circuits having a lower efficiency.

10 Claims, 6 Drawing Sheets

(56) References Cited

U.S. PATENT DOCUMENTS

| | | | | |
|---|---|---|---|---|
| 2015/0138840 A1* | 5/2015 | Muto | H02M 3/33592 | 363/17 |
| 2015/0146456 A1* | 5/2015 | Yamamoto | H02M 3/3378 | 363/17 |
| 2015/0180358 A1* | 6/2015 | Miura | H02M 3/33546 | 363/17 |
| 2015/0229217 A1* | 8/2015 | Hirano | H02M 3/33507 | 363/17 |
| 2015/0244279 A1* | 8/2015 | Takagi | H02M 3/33584 | 363/17 |
| 2015/0263632 A1* | 9/2015 | Hirano | H02M 3/33546 | 363/17 |
| 2015/0295501 A1* | 10/2015 | Hirano | H02M 3/3353 | 363/17 |
| 2015/0295502 A1* | 10/2015 | Hirano | H02M 1/36 | 363/17 |
| 2015/0295503 A1* | 10/2015 | Muto | H02M 3/3353 | 363/17 |
| 2015/0295504 A1* | 10/2015 | Tanahashi | H02J 7/0065 | 307/24 |
| 2016/0105120 A1* | 4/2016 | Hirano | H02M 3/33561 | 363/17 |

FOREIGN PATENT DOCUMENTS

| | | |
|---|---|---|
| DE | 102008044662 A1 | 3/2010 |
| JP | 2011-193713 A | 9/2011 |

* cited by examiner

| | | COMMAND TRANSMITTED POWER | | |
|---|---|---|---|---|
| | | $P_1^*$ | $P_2^*$ | $P_3^*$ |
| DUTY RATIO | $D_1$ | $\phi_1$ | $\phi_2$ | $\phi_3$ |
| | $D_2$ | $\phi_4$ | ... | |
| | $D_3$ | ... | | |
| | $D_4$ | | | |
| | $D_5$ | | | | ical characteristics such as current characteristics) vary

POWER CONVERSION APPARATUS AND METHOD

INCORPORATION BY REFERENCE

The disclosure of Japanese Patent Application No. 2013-265638 filed on Dec. 24, 2013 including the specification, drawings and abstract is incorporated herein by reference in its entirety.

BACKGROUND OF THE INVENTION

1. Field of the Invention

The present invention relates to a technique for performing a power conversion between a primary side full bridge circuit and a secondary side full bridge circuit.

2. Description of Related Art

A power conversion apparatus that converts power between a primary side full bridge circuit and a secondary side full bridge circuit is known (see, for example, Japanese Patent Application Publication No. 2011-193713 (JP 2011-193713)).

However, if characteristics of respective switching elements constituting the full bridge circuits (for example, electrical characteristics such as current characteristics) vary between the respective switching elements, there is a possibility that a power conversion efficiency between the primary side full bridge circuit and the secondary side full bridge circuit decreases.

SUMMARY OF THE INVENTION

Therefore, there is provided a power conversion apparatus and a power conversion method, which can improve a power conversion efficiency between a primary side full bridge circuit and a secondary side full bridge circuit.

According to a first aspect of the invention, there is provided a power conversion apparatus including: a primary side full bridge circuit having a first arm circuit and a second arm circuit in parallel, a secondary side full bridge circuit having a third arm circuit and a fourth arm circuit in parallel, and a control unit configured to adjust a first phase difference between switching of the first arm circuit and switching of the third arm circuit and a second phase difference between switching of the second arm circuit and switching of the fourth arm circuit to control transmitted power that is transmitted between the primary side full bridge circuit and the secondary side full bridge circuit, wherein the control unit configured to cause, among the first phase difference and the second phase difference, the phase difference between the arm circuits having a higher efficiency to be larger than the phase difference between the arm circuits having a lower efficiency.

According to the aspect, the power conversion efficiency between the primary side full bridge circuit and the secondary side full bridge circuit is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Power Supply Apparatus 101>

Figure 1:
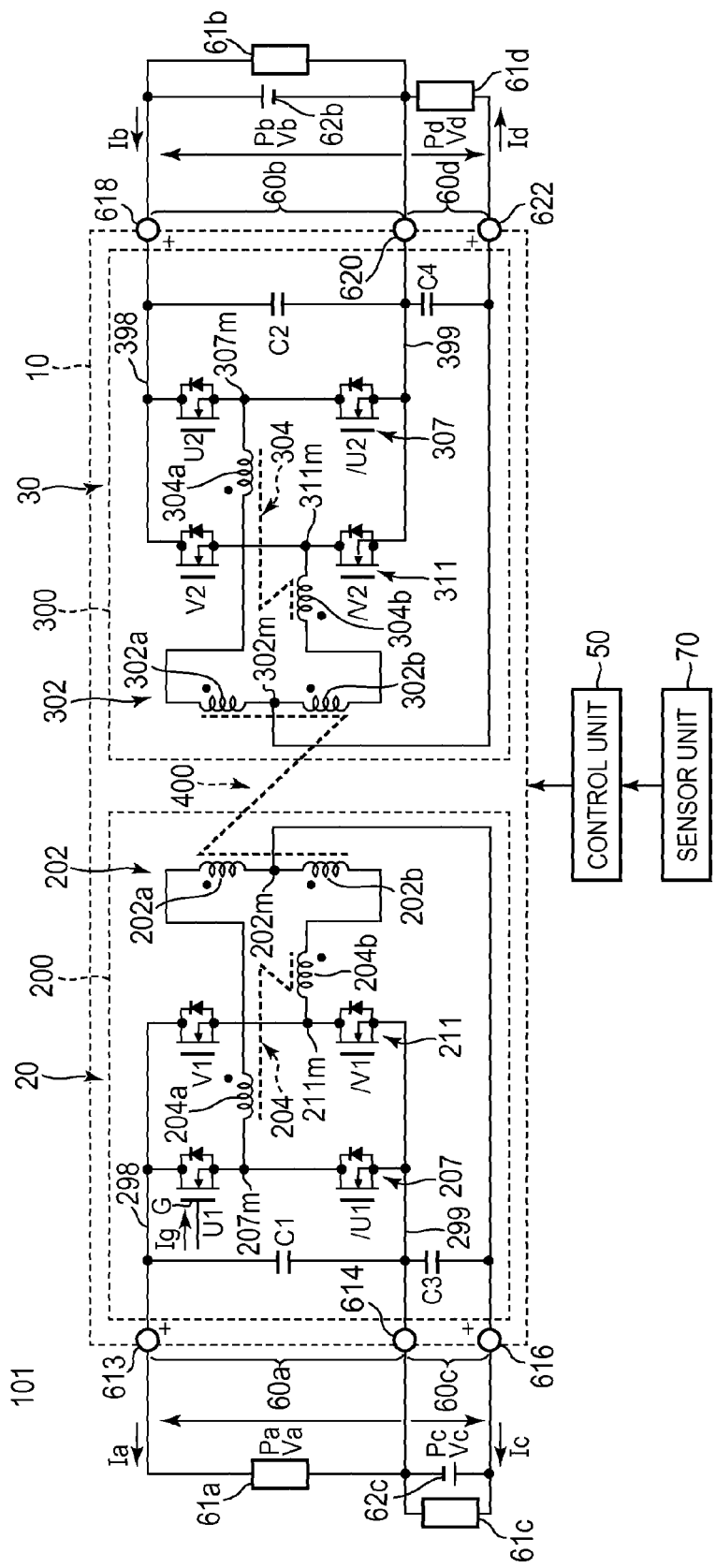
FIG. 1 is a diagram showing an example of a configuration of a power conversion apparatus.

FIG. 1 is a block diagram showing an example of a configuration of a power supply apparatus 101 serving as an first embodiment of a power conversion apparatus. For example, the power supply apparatus 101 is a power supply system that includes a power supply circuit 10, a control unit 50, and a sensor unit 70. For example, the power supply apparatus 101 is a system that is mounted on a vehicle such as an automobile, and distributes power to various loads of the vehicle. A hybrid vehicle, a plug-in hybrid vehicle, an electric vehicle, and so on may be cited as specific examples of this vehicle. The power supply apparatus 101 may also be mounted on a vehicle using an engine as a driving source.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting two desired input/output ports from the four input/output ports and performing a power conversion between the two selected input/output ports. Further, the power supply apparatus 101 including the power supply circuit 10 may be an apparatus that includes a plurality of, at least three, input/output ports, and is capable of converting power between any two input/output ports from the plurality of, at least three, input/output ports. For example, the power supply circuit 10 may also be a circuit that has three input/output ports without the fourth input/output port 60d.

Port powers Pa, Pc, Pb, Pd are input/output powers (input powers or output powers) of the first input/output port 60a, the second input/output port 60c, the third input/output port 60b, and the fourth input/output port 60d, respectively. Port voltages Va, Vc, Vb, Vd are input/output voltages (input voltages or output voltages) of the first input/output port 60a, the second input/output port 60c, the third input/output port 60b, and the fourth input/output port 60d, respectively. Port currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. It should be noted that the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer). The primary side ports configured of the first input/output port 60a and the second input/output port 60c are connected to the secondary side ports configured of the third input/output port 60b and the fourth input/output port 60d via the transformer 400.

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm/U1, a primary side second upper arm V1, and a primary side second lower arm /V1. Here, the primary side first upper arm U1, the primary side first lower arm/U1, the primary side second upper arm V1, and the primary side second lower arm /V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm/U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm/U1 ON and OFF. Further, a primary side second arm circuit 211 connecting the primary side second upper arm V1 and the primary side second lower arm /V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm/U1, and the midpoint 211m is a primary side second intermediate node between the primary side second upper arm V1 and the primary side second lower arm /V1.

The first input/output port 60a is a port provided between the primary side positive electrode bus line 298 and the primary side negative electrode bus line 299. The first input/output port 60a is configured to include the terminal 613 and the terminal 614. The second input/output port 60c is a port provided between the primary side negative electrode bus line 299 and a center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm/U2, a secondary side second upper arm V2, and a secondary side second lower arm /V2. Here, the secondary side first upper arm U2, the secondary side first lower arm/U2, the secondary side second upper arm V2, and the secondary side second lower arm /V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm/U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm/U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm/U2, and the midpoint 311m is a secondary side second intermediate node between the secondary side second upper arm V2 and the secondary side second lower arm /V2.

The third input/output port 60b is a port provided between the secondary side positive electrode bus line 398 and the secondary side negative electrode bus line 399. The third input/output port 60b is configured to include the terminal 618 and the terminal 620. The fourth input/output port 60d is a port provided between the secondary side negative electrode bus line 399 and a center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detected value Yd corresponding to the detected input/output value Y to the control unit 50. The detected value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that, outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60a, 60c, 60b, 60d converges to a target value Yo set in the port. For example, the target value Yo is a command value set by the control unit 50 or a predetermined apparatus other than the control unit 50 on the basis of driving conditions defined in relation to the respective loads (the primary side low voltage system load 61c and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that transmitted power P that is transmitted between the primary side conversion circuit 20 and the secondary side conversion circuit 30 via the transformer 400 converges to set target transmitted power Po. The transmitted power will also be referred to as a power transmission amount. The target transmitted power will also be referred to as a command transmitted power.

The control unit 50 feedback-controls the power conversion operation performed by the power supply circuit 10 by varying a value of a predetermined control parameter X, and is thus capable of adjusting the respective input/output values Y of the first to fourth input/output ports 60a, 60c, 60b, 60d of the power supply circuit 10. Two control variables, namely a phase difference φ and a duty ratio D (an ON time δ) are used as the main control parameters X.

The phase difference φ is a deviation (a time lag) between switching timings of identical-phase power conversion circuit units of the primary side full bridge circuit 200 and the secondary side full bridge circuit 300. The duty ratio D (the ON time δ) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference φ and the duty ratio D (the ON time δ).

Figure 2:
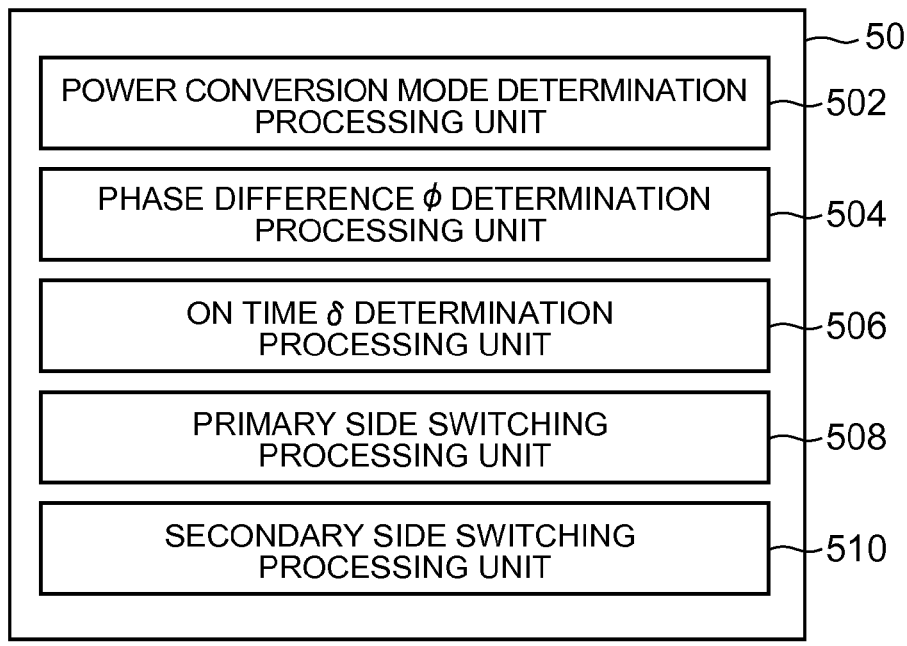
FIG. 2 is a block diagram showing an example of a configuration of a control unit.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference φ determination processing unit 504, an ON time δ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60c is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference φ determination processing unit 504 has a function for setting a phase difference φ between switching period motions of the switching elements between the primary side conversion circuit 20 and the secondary side conversion circuit 30 in order to cause the power supply circuit 10 to function as a direct current-direct current (DC-DC) converter circuit.

The ON time δ determination processing unit 506 has a function for setting an ON time δ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm/U1, the primary side second upper arm V1, and the primary side second lower arm /V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm/U2, the secondary side second upper arm V2, and the secondary side second lower arm /V2, on the basis of the outputs of the power conversion mode determination processing unit 502, the phase difference φ determination processing unit 504, and the ON time δ determination processing unit 506.

<Operation of Power Supply Apparatus 101>

An operation of the power supply apparatus 101 having the above configuration will now be described using FIG. 1 and FIG. 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
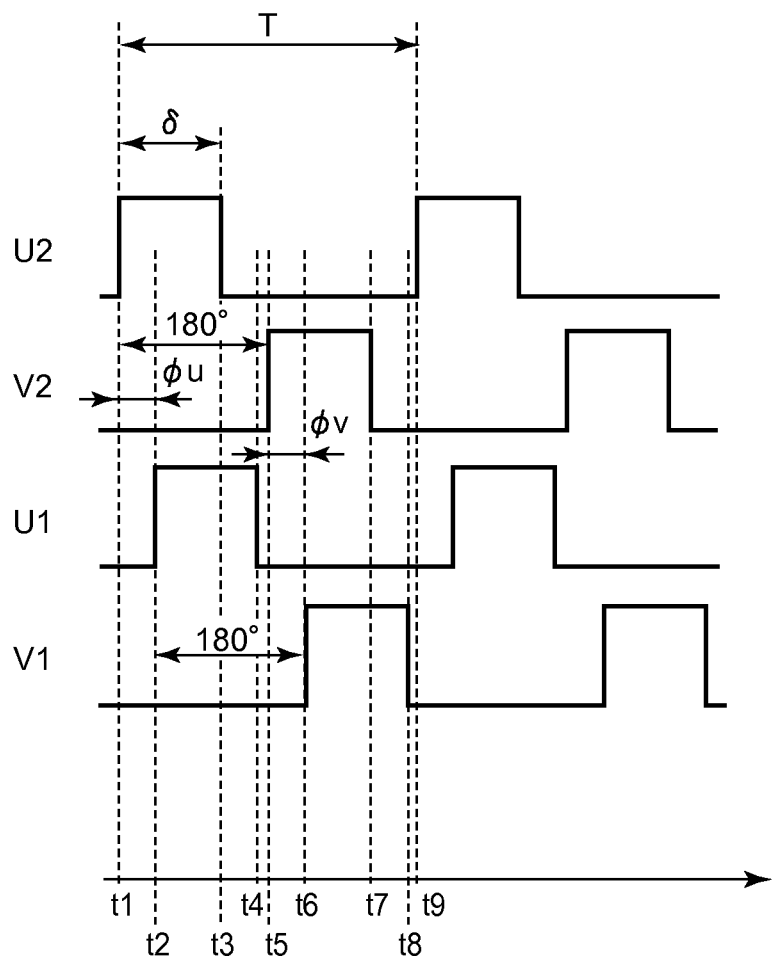
FIG. 3 is a timing chart showing an example of switching operations of a primary side circuit and a secondary side circuit.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm /U1, the primary side second lower arm /V1, the secondary side first lower arm /U2, and the secondary side second lower arm /V2 are inverted waveforms (not shown) obtained by respectively inverting the ON/OFF waveforms of the primary side first-upper arm-U1, the primary side second upper arm V1, the secondary-side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, V1, U2, and V2 equal to each other (respective ON times δ=primary side ON time δ11=secondary side ON time δ12=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example, the step-up/step-down ratio of the primary side conversion circuit 20=the voltage of the second input/output port 60c/the voltage of the first input/output port 60a=δ11/T=α/T, and the step-up/step-down ratio of the secondary side conversion circuit 30=the voltage of the fourth input/output port 60d/the voltage of the third input/output port 60b=δ12/T=α/T. In other words, the respective step-up/step-down ratios of the primary side conversion circuit 20 and the secondary side conversion circuit 30 take identical values (=α/T).

Note that the ON time δ in FIG. 3 represents both the ON time δ11 of the primary side first upper arm U11 and the primary side second upper arm V1 and the ON time δ12 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees ($\pi$), and a phase difference between U2 and V2 is also activated at 180 degrees ($\pi$). The phase difference between U1 and V1 is a time difference between timing t2 and timing t6, and the phase difference between U2 and V2 is a time difference between timing t1 and timing t5.

Moreover, by changing at least one of a phase difference $\phi u$ between U1 and U2 and a phase difference $\phi v$ between V1 and V2, the transmitted power P between the primary side conversion circuit 20 and the secondary side conversion circuit 30 can be adjusted. The phase difference $\phi u$ is a time difference between timing t1 and timing t2, and the phase difference $\phi v$ is a time difference between timing t5 and timing t6.

When the phase difference $\phi u>0$ or the phase difference $\phi v>0$, power can be transmitted from the primary side conversion circuit 20 to the secondary side conversion circuit 30, and when the phase difference $\phi<0$ or the phase difference $\phi v<0$, power can be transmitted from the secondary side conversion circuit 30 to the primary side conversion circuit 20. That is, between identical-phase power conversion circuit units of the primary side full bridge circuit 200 and the secondary side full bridge circuit 300, the transmitted power P is transmitted from the full bridge circuit of the power conversion circuit unit including an upper arm that is turned on first to the full bridge circuit of the power conversion circuit unit including an upper arm that is turned on later.

For example, in FIG. 3, the turn-on timing t1 of the secondary side first upper arm U2 is earlier than the turn-on timing t2 of the primary side first upper arm U1. Therefore, the transmitted power P is transmitted from the secondary side full bridge circuit 300 including the secondary side first arm circuit 307 having the secondary side first upper arm U2 to the primary side full bridge circuit 200 including the primary side first arm circuit 207 having the primary side first upper arm U1. Similarly, the turn-on timing t5 of the secondary side second upper arm V2 is earlier than the turn-on timing t6 of the primary side second upper arm V1. Therefore, the transmitted power P is transmitted from the secondary side full bridge circuit 300 including the secondary side second arm circuit 311 having the secondary side second upper arm V2 to the primary side full bridge circuit 200 including the primary side second arm circuit 211 having the primary side second upper arm V1.

The phase difference $\phi$ is a deviation (a time lag) between the switching timings of the identical-phase power conversion circuit units of the primary side full bridge circuit 200 and the secondary side full bridge circuit 300. For example, the phase difference $\phi u$ is a deviation between the switching timings of the phases corresponding to the primary side first arm circuit 207 and the secondary side first arm circuit 307, and the phase difference $\phi v$ is a deviation between the switching timings of the phases corresponding to the primary side second arm circuit 211 and the secondary side second arm circuit 311.

The control unit 50 typically performs a control in a state that the phase difference $\phi u$ and the phase difference $\phi v$ are equal to each other. However, the control unit 50 may also perform the control in a state that the phase difference $\phi u$ and the phase difference $\phi v$ are offset from one another within a range in which an accuracy required for the transmitted power P is satisfied. That is, the phase difference $\phi u$ and the phase difference $\phi v$ are typically controlled to be values equal to each other, whereas if the accuracy required for the transmitted power P is satisfied, the phase difference $\phi u$ and the phase difference $\phi v$ may be controlled to be values different from each other.

Hence, when, for example, an external signal requesting an operation in which the power conversion mode of the power supply circuit 10 is set at mode F is input, the power conversion mode determination processing unit 502 selects and sets mode F. The ON time $\delta$ determination processing unit 506 then sets the ON time $\delta$ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined according to the ON time $\delta$ set by the ON time $\delta$ determination processing unit 506, and outputs the stepped-down voltage to the fourth input/output port 60d. Further, the phase difference $\phi$ determination processing unit 504 sets the phase difference $\phi$ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm/U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 according to the phase difference $\phi$ is power transmitted from one of the primary side conversion circuit 20 and the secondary side conversion circuit 30 to the other via the transformer 400, and is expressed as $$P=(N \times Va \times Vb)/(\pi \times \omega \times L) \times F(D,\phi) \quad \text{Equation 1}$$

Note that N is a winding ratio of the transformer 400, Va is the input/output voltage of the first input/output port 60a, Vb is the input/output voltage of the third input/output port 60b, $\pi$ is pi, $\omega$ ($=2\pi \times f=2\pi/T$) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

The control unit 50 varies the phase difference φ such that a port voltage Vp of at least one predetermined port of the primary side ports and the secondary side ports converges to a target port voltage Vo, thereby to adjust the transmitted power P. Therefore, even if the current consumed by a load connected to the predetermined port increases, the control unit 50 can adjust the transmitted power P by changing the phase difference φ, thereby to prevent the port voltage Vp from decreasing with respect to the target port voltage Vo.

For example, the control unit 50 changes the phase difference φ such that a port voltage Vp of one port that is the transmission destination of the transmitted power P of the primary side ports and the secondary side ports converges to a target port voltage Vo, thereby to adjust the transmitted power P. Therefore, even if the current consumed by a load connected to the port that is the transmission destination of the transmitted power P increases, the control unit 50 may adjust the transmitted power P in an increase direction by changing the phase difference φ to increase, thereby to prevent the port voltage Vp from decreasing with respect to the target port voltage Vo.

<Power Conversion Method to Improve Power Conversion Efficiency>

The control unit 50 is an example of a control unit of controlling the transmitted power P that is transmitted between the primary side full bridge circuit 200 and the secondary side full bridge circuit 300 by adjusting the phase difference φu and the phase difference φv (see FIG. 3).

The phase difference φu is a time difference between switching of the primary side first arm circuit 207 and switching of the secondary side first arm circuit 307. For example, the phase difference φu is a difference between the turn-on timing t2 of the primary side first upper arm U1 and the turn-on timing t1 of the secondary side first upper arm U2. The control unit 50 controls the switching of the primary side first arm circuit 207 and the switching of the secondary side first arm circuit 307 in an identical-phase with each other (that is, in the U phase). Similarly, the phase difference φv is a time difference between switching of the primary side second arm circuit 211 and switching of the secondary side second arm circuit 311. For example, the phase difference φv is a difference between the turn-on timing t6 of the primary side second upper arm V1 and the turn-on timing t5 of the secondary side second upper arm V2. The control unit 50 controls the switching of the primary side second arm circuit 211 and the switching of the secondary side second arm circuit 311 in an identical-phase with each other (that is, in the V phase).

The control unit 50 performs a power conversion control to, among the phase difference φu and the phase difference φv, cause the phase difference between the arm circuits having a higher efficiency to be larger than the phase difference between the arm circuits having a lower efficiency. For example, when a power conversion efficiency ηu of an identical-phase between the primary side first arm circuit 207 and the secondary side first arm circuit 307 is larger than a power conversion efficiency ηv of an identical-phase between the primary side second arm circuit 211 and the secondary side second arm circuit 311, the control unit 50 causes the phase difference φu to be larger than the phase difference φv. To the contrary, when the power conversion efficiency ηu of an identical-phase between the primary side first arm circuit 207 and the secondary side first arm circuit 307 is lower than the power conversion efficiency ηv of an identical-phase between the primary side second arm circuit 211 and the secondary side second arm circuit 311, the control unit 50 causes the phase difference φv to be larger than the phase difference φu.

The efficiency ηu represents a power conversion efficiency for generating the transmitted power P that is transmitted during a period t2-t3 in which the ON time of the primary side first upper arm U1 and the ON time of the secondary side first upper arm U2 overlap. The efficiency ηv represents a power conversion efficiency for generating the transmitted power P that is transmitted during a period t6-t7 in which the ON time of the primary side second upper arm V1 and the ON time of the secondary side second upper arm V2 overlap.

Therefore, by, among the phase difference φu and the phase difference φv, causing the phase difference between the arm circuits having a higher efficiency to be larger than the phase difference between the arm circuits having a lower efficiency, even if characteristics of respective arms constituting the arm circuits vary between the respective arms, a transmission efficiency of the transmitted power P is improved. Therefore, a power conversion efficiency η between the primary side full bridge circuit 200 and the secondary side full bridge circuit 300 is improved.

For example, it may be defined as the efficiency η$u$=(a drain efficiency of the primary side first upper arm $U1$+a drain efficiency of the primary side second lower arm/$V1$+a drain efficiency of the secondary side first upper arm $U2$+a drain efficiency of the secondary side second lower arm/$V2$)÷4    Equation 2 the efficiency η$v$=(a drain efficiency of the primary side second upper arm $V1$+a drain efficiency of the primary side first lower arm/$U1$+a drain efficiency of the secondary side second upper arm $V2$+a drain efficiency of the secondary side first lower arm/$U2$)÷4    Equation 3

For example, the drain efficiency is defined as a ratio of output power that is output from the input/output port to which the full bridge circuit is connected (=output voltage× output current) to power consumed by respective phase arms when the respective phases are ON (≈drain voltage×drain current). For example, in the case of the primary side first upper arm U1, the power consumed by the respective phase arms when the respective phases are ON is a product of the drain voltage and the drain current when the primary side first upper arm U1 is ON. The output power that is output from the input/output port to which the full bridge circuit is connected is port power that is output from one port among the primary side ports to which the primary full bridge circuit 200 is connected and the secondary side ports to which the secondary side full bridge circuit 300 is connected.

The drain voltages of the respective arms are drain-source voltages of the respective arms, and the drain currents of the respective arms are drain-source currents flowing through the respective arms. The drain voltages and the drain currents of the respective arms and the port power that is output from the one port are detected by the sensor unit 70.

Further, for example, it can be defined as the efficiency η$u$=(a heat generation amount of the primary side first upper arm $U1$+a heat generation amount of the primary side second lower arm/V1+a heat generation amount of the secondary side first upper arm U2+a heat generation amount of the secondary side second lower arm/V2)÷(4×the maximum heat generation amount of all the 8 arms)  Equation 4 the efficiency ηv=(a heat generation amount of the primary side-second-upper arm V1+a heat generation amount of the primary side first lower arm/U1+a heat generation amount of the secondary side second upper arm V2+a heat generation amount of the secondary side first lower arm/U2) ÷(4×the maximum heat generation amount of all the 8 arms)  Equation 5

The heat generation amount can be replaced with temperature. The maximum heat generation amount of all the 8 arms (or the maximum temperature) is the maximum heat generation amount (or the highest temperature) of all the 8 arms of which the primary side full bridge circuit 200 and the secondary side full bridge circuit 300 are configured. The heat generation amount or the temperature of each arm is detected by the sensor unit 70.

Further, the efficiencies ηu and ηv are not limited to the values as defined above, as long as the efficiencies ηu and ηv may be equivalently represented.

Figures 4, 5:
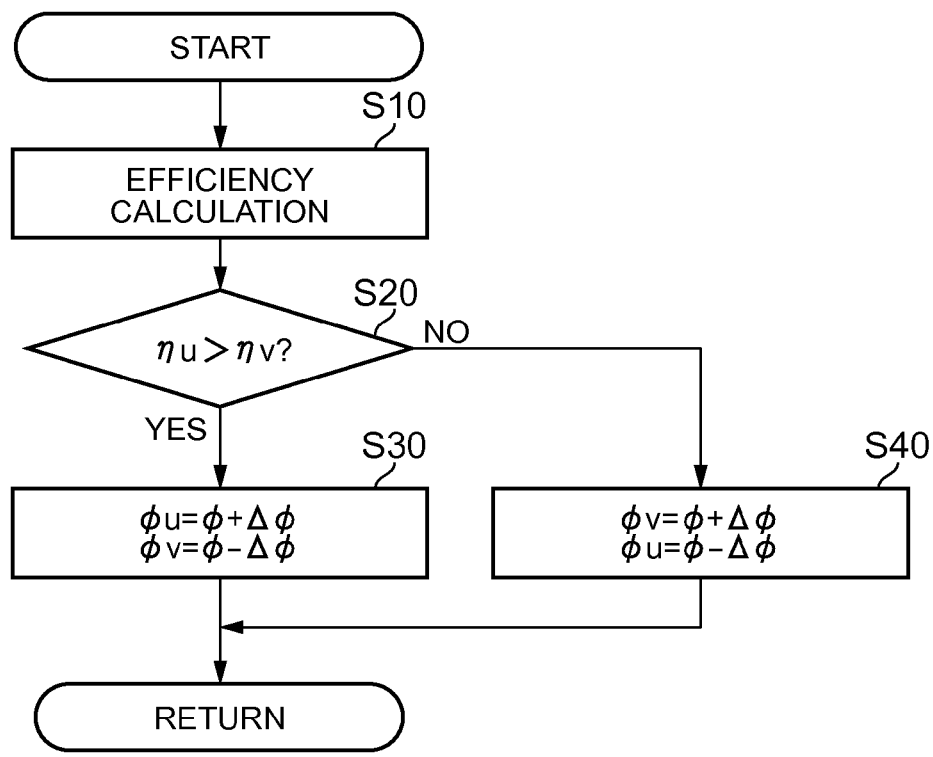
FIG. 4 is a flowchart showing an example of a power conversion method.
FIG. 5 is an example of a map for calculating a standard phase difference ϕ.

FIG. 4 is a flowchart showing a first example of a power conversion method performed by the control unit 50.

In step S10, the control unit 50 calculates efficiencies of the respective arms, for example, calculates the efficiency ηu and the efficiency ηv as defined above.

In step S20, the control unit 50 compares the magnitude relationship between the efficiency ηu and the efficiency ηv that are calculated in step S10. If it is determined that the efficiency ηu is larger than the efficiency ηv, the control unit 50 causes the phase difference φu to be larger than the phase difference φv by extending the phase difference φu and shortening the phase difference φv (step S30). On the other hand, if it is determined that the efficiency ηu is smaller than the efficiency ηv, the control unit 50 causes the phase difference φv to be larger than the phase difference φu by shortening the phase difference φu and extending the phase difference φv (step S40).

In step S30, the control unit 50 sets a value that is obtained by adding a change amount Δφ to a standard phase difference φ as the phase difference φu and sets a value obtained by subtracting the change amount Δφ from the standard phase difference φ as the phase difference φv. On the other hand, in step S40, the control unit 50 sets a value that is obtained by adding the change amount Δφ to the standard phase difference φ as the phase difference φv and sets a value obtained by subtracting the change amount Δφ from the standard phase difference φ as the phase difference φu.

For example, the change amount Δφ is defined as

Δφ=the standard phase difference φ×(ηu−ηv)  Equation 6

The right side of Equation 6 may be multiplied by any proportional constant.

The control unit 50 may calculate the standard phase difference φ according to Equation 1, or may perform the calculation according to a map defining the relationship of Equation 1.

FIG. 5 is a diagram showing an example of a map for calculating the standard phase difference φ. The map is stored in advance in a memory. The control unit 50 calculates the standard phase difference φ (for example, $φ_1$, $φ_2$, $φ_3$, $φ_4$, ... ) based on the command transmitted power P* and a command duty ratio D* according to the map of FIG. 5. The command transmitted power P* is a target value of the transmitted power P (for example, target transmission powers $P_1$*, $P_2$*, $P_3$*, ... ), and the command duty ratio D* is a target value of the duty ratio D (for example, target duty ratios $D_1$*, $D_2$*, $D_3$*, $D_4$*, $D_5$*, ... ).

The control unit 50 can calculate optimum values of the phase difference φu and the phase difference φv by correcting the standard phase difference φ based on the addition and subtraction of the change amount Δφ as in steps S30 and S40. Further, the control unit 50 can improve the power conversion efficiency η by, among the phase difference φu and the phase difference φv, extending the phase difference between the arm circuits having a higher efficiency and shortening the phase difference between the arm circuits having a lower efficiency such that the transmitted power P does not vary with respect to the command transmitted power P*. Since variation of the transmitted power P with respect to the command transmitted power P* is suppressed, variation of output power that is output to a port from one full bridge circuit can be suppressed.

Note that there is a possibility that the ripple in the output of the full bridge circuit increases if the phase difference φu and the phase difference φv are adjusted to values different from each other. Therefore, for example, the upper limit value of the change amount Δφ can be set to a value such that the ripple of the output voltage converges within a predetermined range.

Further, if the control unit 50 calculates the efficiencies ηu and ηv for the respective switching periods of the respective arms, its calculation load increases. In view of this, for example, the control unit 50 may repeat the calculation of efficiencies ηu and ηv and the adjustment of the phase differences φu and φv at periods that are sufficiently lagged as compared with the switching periods of the respective arms (for example, 2-3 seconds).

Further, for example, in order to accommodate aging of the respective arms, the control unit 50 may also perform the calculation of efficiencies ηu and ηv and the adjustment of the phase differences φu and φv a predetermined number of times (for example, once) at any timing from turn-on to turn-off of an ignition switch. Further, for example, in order to accommodate changes in the temperatures of the respective arms, the control unit 50 may also perform the calculation of efficiencies ηu and ηv and the adjustment of the phase differences φu and φv at timing when the ambient temperature rises to a predetermined threshold temperature.

Figure 6:
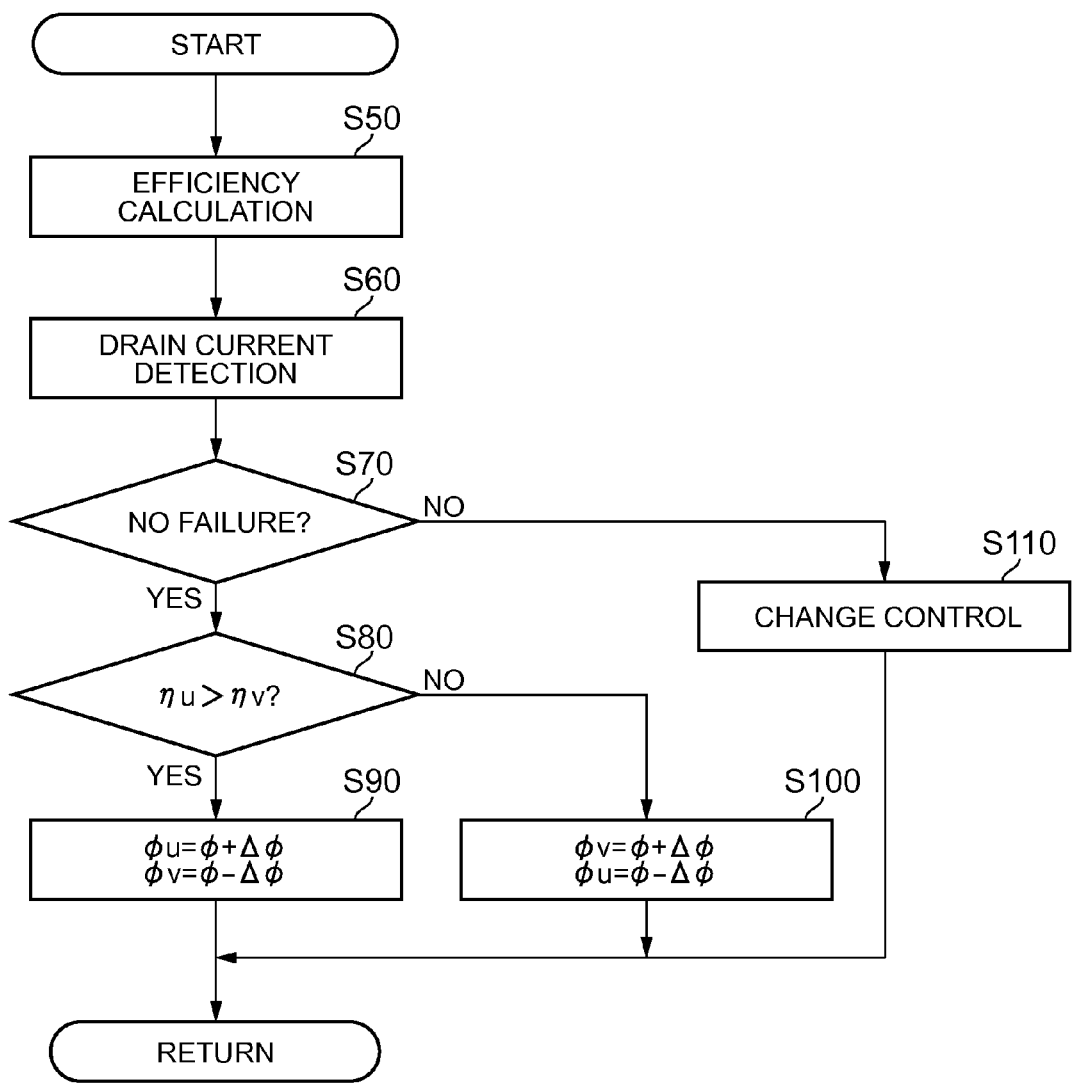
FIG. 6 is a flowchart showing an example of a power conversion method.

FIG. 6 is a flowchart showing a second example of the power conversion method performed by the control unit 50.

In step S50, the control unit 50 calculates efficiencies of the respective arms, for example, calculates the efficiency ηu and the efficiency ηv as defined above.

In step S60, the control unit 50 detects gate currents Ig of the respective arms when the respective arms are turned on, and stores the detected values in a memory. If the gate currents Ig are detected a plurality of times during the period from turn-on to turn-off of the ignition switch, the control unit 50 stores the average value or the last detected value of the gate currents Ig that are detected a plurality of times in the memory.

The gate current Ig is an example of a control current flowing through the gate electrode of the arm, and the gate electrode is an example of the control electrode of the arm. In FIG. 1, the gate current flowing through the gate electrode G of the primary side first upper arm U1 may be cited as an example of the gate current Ig. Of course, however, the gate current may also flow through the gate electrodes of the arms other than the primary side first upper arm U1.

In step S70, the control unit 50 determines whether the respective arms have a failure based on the changes in the gate currents Ig of the respective arms. For example, the control unit 50 determines an arm of which the change amount of the detected value of the gate current Ig that is currently detected with respect to the stored value of the gate current Ig stored in the memory is above a predetermined change amount to be an arm in which a failure occurs. Alternatively, for example, the control unit 50 determines an arm of which the detected value of the gate current Ig that is currently detected exceeds a predetermined current threshold to be an arm in which a failure occurs.

If it is determined that a failure does not occur in any one of the respective arms, the control unit 50 performs the processing of step S80, and if it is determined that a failure does occur in one of the respective arms, the control unit 50 performs the processing of step S110.

In step S80, the control unit 50 compares the magnitude relationship between the efficiency ηu and the efficiency ηv that are calculated in step S50. If it is determined that the efficiency ηu is larger than the efficiency ηv, the control unit 50 causes the phase difference φu to be larger than the phase difference φv by extending the phase difference φu and shortening the phase difference φv (step S90). On the other hand, if it is determined that the efficiency ηu is smaller than the efficiency ηv, the control unit 50 causes the phase difference φv to be larger than the phase difference φu by shortening the phase difference φu and extending the phase difference φv (step S100). Step S90 and step S100 may be the same as step S30 and step S40 as described above, respectively.

On the other hand, if it is determined that a failure occurs in one of the respective arms in step S70, the control unit 50 changes to a control that does not use the arm in which the failure occurs (step S110). In this way, progress of the failure of the arm can be suppressed.

In step S110, for example, the control unit 50 performs at least one of the fail-safe controls as described below. For example, the control unit 50 configured to stop the control of causing the phase difference between the arm circuits having a higher efficiency to be larger than the phase difference between the arm circuits having a lower efficiency. For example, the control unit 50 notifies outside of the failure of the arm. For example, the control unit 50 controls the transmitted power P that is transmitted between the full bridge circuits and the output power that is output from one full bridge circuit by operating the full bridge circuit with a half bridge that does not use the arm having a gate current Ig above a reference value flow through the gate electrode. In this case, the control unit 50 preferably causes the transmitted power P or the upper limit of the output circuit to decrease as compared with typical case.

Therefore, it is possible to continue transmission of the transmitted power P even if a failure occurs in the arms.

<Configuration of Power Supply Apparatus 102>

Figure 7:
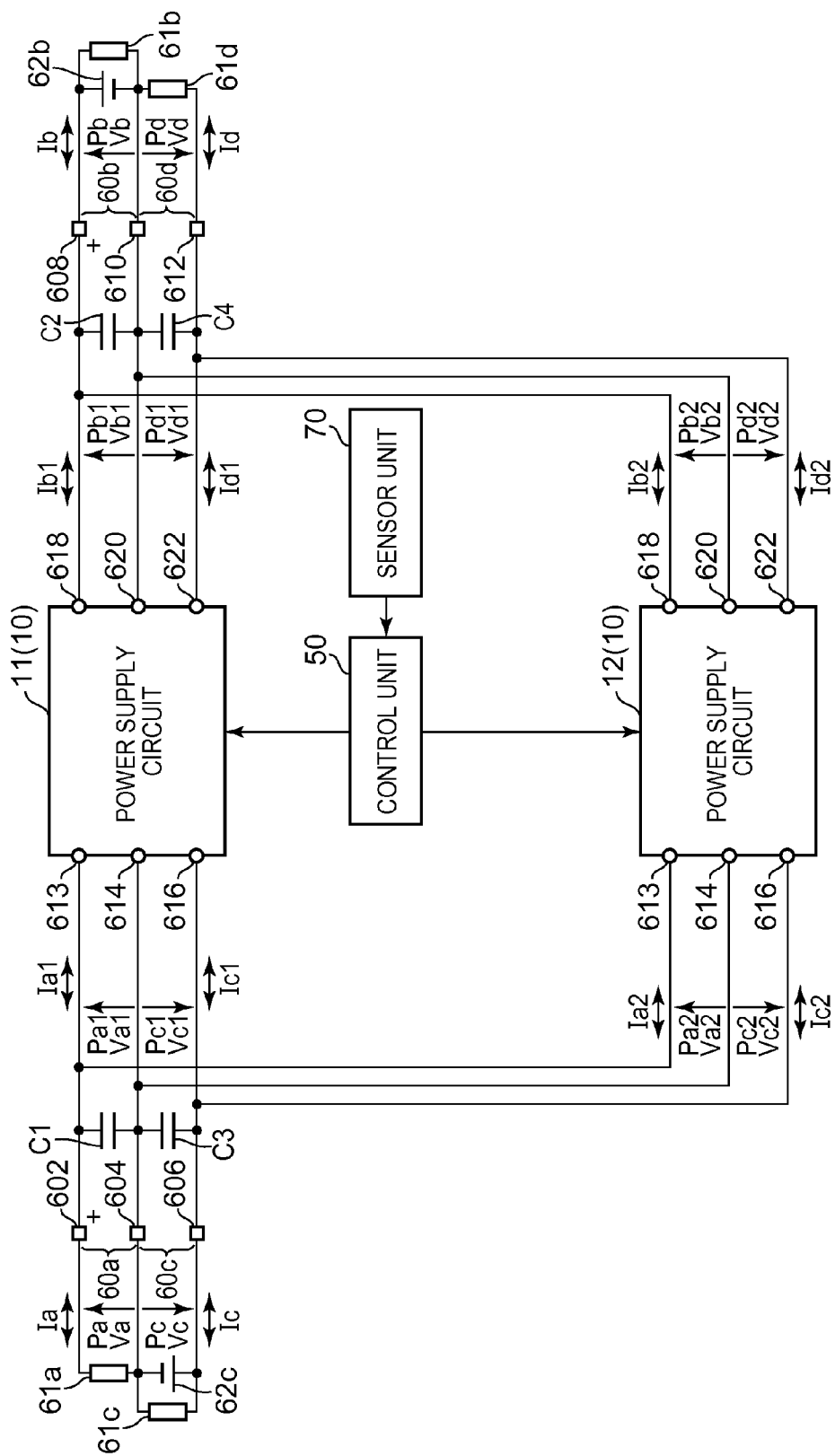
FIG. 7 is a diagram showing an example of the configuration of the power conversion apparatus.

FIG. 7 is a block diagram showing an example of a configuration of a power supply apparatus 102 serving as a second embodiment of the power conversion apparatus. Description of the same or similar structure and effect to the embodiment described above is omitted or simplified. For example, the power supply apparatus 102 is a power supply system that includes a first power supply circuit 11, a second power supply circuit 12, a control unit 50, and a sensor unit 70.

The power supply apparatus 102 is a DC-DC converter that includes two power supply circuits 11, 12 that are connected in parallel to each other between the first input/output port 60a, the second input/output port 60c and the third input/output port 60b, the fourth input/output port 60d. By providing redundantly a plurality of power supply circuits in this way, the output power capable of being supplied to the respective loads 61a, 61b, 61c, 61d may increase, and the fail-safe performance when a failure occurs in a portion of the plurality of power supply circuits can be improved.

The power supply apparatus 102 has the power supply circuit 11 and the power supply circuit 12 in parallel. Each of the power supply circuit 11 and the power supply circuit 12 is the same as the power supply circuit 10 of FIG. 1.

Port powers Pa1, Pc1, Pb1, Pd1 are powers that are input or output in the power supply circuit 11 respectively, and port powers Pa2, Pc2, Pb2, Pd2 are powers that are input or output in the power supply circuit 12 respectively. Port voltages Va1, Vc1, Vb1, Vd1 are voltages that are input or output in the power supply circuit 11 respectively, and port voltages Va2, Vc2, Vb2, Vd2 are voltage that are input or output in the power supply circuit 12 respectively. Port currents Ia1, Ic1, Ib1, Id1 are currents that are input or output in the power supply circuit 11 respectively, and port currents Ia2, Ic2, Ib2, Id2 are currents that are input or output in the power supply circuit 12 respectively.

The control unit 50 varies the input/output powers of the respective input/output ports of the power supply circuits 11 and 12 by adjusting the phase differences φ and the duty ratios D of the respective power supply circuits 11 and 12. Thereby, the input/output values Y of the respective input/output ports 60a to 60d of the power supply apparatus 102 are varied. For example, the control unit 50 varies the duty ratio D and the phase difference φ of at least one of the power supply circuits 11 and 12 such that a detected value Yd of the input/output value Y follows a target value Yo.

The control unit 50 extends, among the power supply circuits 11 and 12, the phase difference φu and the phase difference φv in the power supply circuit having a higher efficiency, and shortens the phase difference φu and the phase difference φv in the power supply circuit having a lower efficiency. Thereby, the power conversion efficiency between the primary side ports and the secondary side ports of the power supply apparatus 102 can be improved in consideration of the power conversion efficiencies of the respective power supply circuits 11 and 12. Further, the power conversion efficiency between the primary side ports and the secondary side ports of the power supply apparatus 102 can be improved such that the transmitted power P does not vary with respect to the command transmitted power P*. Since variation of the transmitted power P with respect to the command transmitted power P* is suppressed, variation of output power that is output to a port from a full bridge circuit can be suppressed.

For example, if an efficiency $\eta_{11}$ of the power supply circuit 11 is higher than an efficiency $\eta_{12}$ of the power supply circuit 12, the control unit 50 extends both the phase difference φu and the phase difference φv in the power supply circuit 11 and shortens both the phase difference φu and the phase difference φv in the power supply circuit 12. To the contrary, if the efficiency $\eta_{12}$ of the power supply circuit 12 is higher than the efficiency $\eta_{11}$ of the power supply circuit 11, the control unit 50 extends both the phase difference φu and the phase difference φv in the power supply circuit 12 and shortens both the phase difference φu and the phase difference φv in the power supply circuit 11.

The efficiency $\eta_{11}$ is the power conversion efficiency between the primary side ports and the secondary side ports in the power supply circuit 11, and is represented by a ratio of output power to input power in the power supply circuit 11, for example. The efficiency $\eta_{12}$ is the power conversion efficiency between the primary side ports and the secondary side ports in the power supply circuit 12, and is represented by a ratio of the output power to the input power in the power supply circuit 12, for example.

When input power that is input to one port among the primary side ports and the secondary side ports is defined as Pin, output power that is output from other port is defined as Pout, an input voltage that is input to the one port is defined as Vin, an output voltage that is output from the other port is defined as Vout, an input current that is input to the one port is defined as Iin, and an output current that is output from the other port is defined as Iout, the efficiency $\eta_{11}$ can be expressed as $$\eta_{11}=Pout/Pin=(Vout \times Iout)/(Vin \times Iin) \qquad \text{Equation 7}$$

The efficiency $\eta_{12}$ can be expressed similarly as Equation 7.

For example, in the power supply circuit 11 of FIG. 7, when the port power Pb1 that is input to the third input/output port is converted and the converted port power Pa1 is output to the first input/output port, and the power Pa1 of the first input/output port is converted and the converted port power Pc1 is output to the second input/output port, according to Equation 7, the efficiency $\eta_{11}$ of the power supply circuit 11 can be expressed as $$\eta_{11}=(Va1 \times Ia1+Vc1 \times Ic1)/(Vb1 \times Ib1) \qquad \text{Equation 8}$$

Note that Equation 8 is an equation in the case of not using the fourth input/output port, and the input/output power of the fourth input/output port is set to zero (for example, a configuration without the secondary side low voltage system load 61d and the capacitor C4). The efficiency $\eta_{12}$ can be expressed similarly as Equation 8.

The power conversion method performed by the control unit 50 of the power supply apparatus 102 can invoke the flowchart shown in FIG. 4 or FIG. 6 as described above. Hereinafter, according to the flowchart shown in FIG. 6, the power conversion method to be executed by the control unit 50 of the power supply apparatus 102 will be explained. In addition, the same steps as the steps described above will not be described.

In step S50, the control unit 50 calculates efficiencies of the respective arms, for example, calculates the efficiency $\eta u$ and the efficiency $\eta v$ as defined above for the power supply circuits 11 and 12 respectively. Further, in step S50, the control unit 50 calculates the efficiency $\eta_{11}$ of the power supply circuit 11 and the efficiency $\eta_{12}$ of the power supply circuit 12.

For example, it can be defined as $$\eta_{11}=\text{output power of the power supply circuit } 11 \div$$
$$(\text{total drain current} \times \text{total drain voltage of the power supply circuit } 11) \qquad \text{Equation 9}$$

$$\eta_{12}=\text{output power of the power supply circuit } 12 \div$$
$$(\text{total drain current} \times \text{total drain voltage of the power supply circuit } 12) \qquad \text{Equation 10}$$

The output power of the power supply circuit 11 (or the power supply circuit 12) is port power output from one full bridge circuit of the power supply circuit 11 (or the power supply circuit 12). The total drain current is the sum of the drain currents of the 8 arms constituting the power supply circuit, and the total drain voltage is the sum of the drain voltages of the 8 arms constituting the power supply circuit.

In step S80, the control unit 50 compares the magnitude relationship between the efficiency $\eta u$ and the efficiency $\eta v$ of the power supply circuit 11 that are calculated in step S50, and compares the magnitude relationship between the efficiency $\eta u$ and the efficiency $\eta v$ of the power supply circuit 12 that are calculated in step S50. Further, in step S80, the control unit 50 compares the magnitude relationship between the efficiency $\eta_{11}$ and the efficiency $\eta_{12}$ that are calculated in step S50.

According to the comparison result in step 80, as described below, the control unit 50 derives the phase differences $\phi u$ and $\phi v$ by correcting the standard phase difference $\phi$ with change amounts $\Delta\phi$ and $\Delta\Phi$. For example, the change amount $\Delta\phi$ may be defined by Equation 6 above. For example, the change amount $\Delta\Phi$ may be defined as $$\Delta\Phi=\text{the standard phase difference } \phi \times (\eta_{11}-\eta_{12}) \qquad \text{Equation 11}$$

The right side of Equation 11 may be multiplied by any proportional constant.

If it is determined in step S80 that the efficiency $\eta u$ of the power supply circuit 11 is larger than the efficiency $\eta v$ of the power supply circuit 11 and the efficiency $\eta_{11}$ is larger than the efficiency $\eta_{12}$, the control unit 50 derives the phase differences $\phi u$ and $\phi v$ of the power supply circuit 11 by correcting the standard phase difference $\phi$ specified to the power supply circuit 11 with the change amounts $\Delta\phi$ and $\Delta\Phi$ according to $$\phi u \text{ of the power supply circuit } 11=(\phi+\Delta\phi)+\Delta\Phi, \phi v \text{ of}$$
$$\text{the power supply circuit } 11=(\phi-\Delta\phi)+\Delta\Phi \qquad \text{Equation 12}$$

On the other hand, if it is determined in step S80 that the efficiency $\eta u$ of the power supply circuit 12 is larger than the efficiency $\eta v$ of the power supply circuit 12 and the efficiency $\eta_{11}$ is larger than the efficiency $\eta_{12}$, the control unit 50 derives the phase differences $\phi u$ and $\phi v$ of the power supply circuit 12 by correcting the standard phase difference $\phi$ specified to the power supply circuit 12 with the change amounts $\Delta\phi$ and $\Delta\Phi$ according to $$\phi u \text{ of the power supply circuit } 12=(\phi+\Delta\phi)-\Delta\Phi, \phi v \text{ of}$$
$$\text{the power supply circuit } 12=(\phi-\Delta\phi)-\Delta\Phi \qquad \text{Equation 13}$$

Further, if it is determined in step S80 that the efficiency $\eta u$ of the power supply circuit 11 is larger than the efficiency $\eta v$ of the power supply circuit 11 and the efficiency $\eta_{11}$ is smaller than the efficiency $\eta_{12}$, the control unit 50 derives the phase differences $\phi u$ and $\phi v$ of the power supply circuit 11 by correcting the standard phase difference $\phi$ specified to the power supply circuit 11 with the change amounts $\Delta\phi$ and $\Delta\Phi$ according to $$\phi u \text{ of the power supply circuit } 11=(\phi+\Delta\phi)-\Delta\Phi, \phi v \text{ of}$$
$$\text{the power supply circuit } 11=(\phi-\Delta\phi)-\Delta\Phi \qquad \text{Equation 14}$$

On the other hand, if it is determined in step S80 that the efficiency $\eta u$ of the power supply circuit 12 is larger than the efficiency $\eta v$ of the power supply circuit 12 and the efficiency $\eta_{11}$ is smaller than the efficiency $\eta_{12}$, the control unit 50 derives the phase differences $\phi u$ and $\phi v$ of the power supply circuit 12 by correcting the standard phase difference $\phi$ specified to the power supply circuit 12 with the change amounts $\Delta\phi$ and $\Delta\Phi$ according to $$\phi u \text{ of the power supply circuit } 12=(\phi+\Delta\phi)+\Delta\Phi, \phi v \text{ of}$$
$$\text{the power supply circuit } 12=(\phi-\Delta\phi)+\Delta\Phi \qquad \text{Equation 15}$$

Further, if the efficiency $\eta u$ is smaller than the efficiency $\eta v$, the control unit 50 derives the respective phase differences $\phi u$ and $\phi v$ of the power supply circuits 11 and 12 according to equations that are obtained by replacing $(\phi+\Delta\phi)$ and $(\phi-\Delta\phi)$ in right side of Equations 12 to 15 with $(\phi-\Delta\phi)$ and $(\phi+\Delta\phi)$ respectively.

When it is determined that a failure occurs in one of the respective arms in step S70, the control unit 50 changes to a control that does not use the arm in which the failure occurs (step S110).

In step S110, for example, the control unit 50 performs at least one of the fail-safe controls as described below. For example, the control unit 50 completely stops one power supply circuit having an arm that is determined to be faulty and use the other power supply circuit having a normal arm that is not determined to be faulty, to control the transmitted power P and the output power. For example, the control unit 50 does not use a half bridge of an arm that is determined to be faulty to operate the full bridge circuit of one power supply circuit and uses the other power supply circuit having a normal arm that is not determined to be faulty, to control the transmitted power P and the output power. The control unit 50 may operate the normal power supply circuit if the maximum output is required to support the power supply circuit that is operating with a half bridge, or operate the power supply circuit having a faulty arm with a half bridge temporarily to prevent a shortage of the output power.

For example, a scene where a direction indicator is issued before a curve, before an intersection at a low speed and so on may be cited as the case that the maximum output is required. Locations where the maximum output is required are stored in a memory, and the control unit 50 performs the fail-safe control as described above at the locations where the maximum output is required or when a vehicle travels before the locations.

The power conversion apparatus and the power conversion method were described above by means of an embodiment, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

Further, in FIG. 1, although the primary side low voltage system power supply 62c is connected to the second input/output port 60c, the power supply may be connected to neither the first input/output port 60a nor the second input/output port 60c.

Further, the present invention is suitable for a power conversion apparatus that has a plurality of, at least three or more, input/output ports and is capable of converting power between any two input/output ports of the plurality of, at least three or more, input/output ports. For example, the present invention is also suitable for the power supply apparatus configured to not include any one input/output port of the four input/output ports as illustrated in FIG. 1.

Further, in the above description, the primary side may be defined as the second side, and the second side may be defined as the primary side. In the above description, although a case that the transmitted power P is transmitted to the primary side ports from the secondary side ports has been illustrated as an example, the above description can also be applied to the case that the transmitted power P is transmitted to the secondary side ports from the primary side ports.

Further, one phase difference of the phase difference $\phi u$ and the phase difference $\phi v$ being larger than the other phase difference has the same meaning as that the other phase difference is smaller that the one phase difference. The control unit 50 may cause one phase difference to be larger than the other phase difference by shortening the other phase difference while fixing the one phase difference. In contrary, the control unit 50 may also cause one phase difference to be larger than the other phase difference by extending the one phase difference while fixing the other phase difference.

Further, if it is determined that the efficiency $\eta u$ and the efficiency $\eta v$ are equal to each other, the control unit 50 may set the phase difference $\phi v$ and the phase difference $\phi v$ to values equal to each other (typically, the standard phase difference $\phi$).

What is claimed is:

1. A power conversion apparatus comprising:
   a primary side full bridge circuit having a first arm circuit and a second arm circuit in parallel,
   a secondary side full bridge circuit having a third arm circuit and a fourth arm circuit in parallel, and
   a control unit configured to adjust a first phase difference between switching of the first arm circuit and switching of the third arm circuit and a second phase difference between switching of the second arm circuit and switching of the fourth arm circuit to control transmitted power that is transmitted between the primary side full bridge circuit and the secondary side full bridge circuit,
   wherein the control unit, among the first phase difference and the second phase difference, configured to cause the phase difference between the arm circuits having a higher efficiency to be larger than the phase difference between the arm circuits having a lower efficiency.

2. The power conversion apparatus according to claim 1, wherein
   the control unit configured to extend the phase difference between the arm circuits having the higher efficiency and shorten the phase difference between the arm circuits having the lower efficiency.

3. The power conversion apparatus according to claim 1, wherein
   the efficiency is a power conversion efficiency for generating the transmitted power that is transmitted during a period in which ON time of an upper arm of the first arm circuit and ON time of an upper arm of the third arm circuit overlap, or a power conversion efficiency for generating the transmitted power that is transmitted during a period in which ON time of an upper arm of the second arm circuit and ON time of an upper arm of the fourth arm circuit overlap.

4. The power conversion apparatus according to claim 1, wherein
   the efficiency is defined by any one of following equations, the efficiency=(a drain efficiency of an upper arm of the first arm circuit+a drain efficiency of a lower arm of the second arm circuit+a drain efficiency of an upper arm of the third arm circuit+a drain efficiency of a lower arm of the fourth arm circuit)÷4     Equation (1):

the efficiency=(a drain efficiency of an upper arm of the second arm circuit+a drain efficiency of a lower arm of the first arm circuit+a drain efficiency of an upper arm of the fourth arm circuit+a drain efficiency of a lower arm of the third arm circuit)÷4     Equation (2):

5. The power conversion apparatus according to claim 4, wherein
   the drain efficiency is determined according to a ratio of power consumed by a switching element to output power of the primary side full bridge circuit or the secondary side full bridge circuit, the switching element constituting any one of the first arm circuit, the second arm circuit, the third arm circuit, and the fourth arm circuit.

6. The power conversion apparatus according to claim 1, wherein
the efficiency is determined according to heat generation amounts of switching elements constituting the first arm circuit, the second arm circuit, the third arm circuit, and the fourth arm circuit.

7. The power conversion apparatus according to claim 1, wherein
the control unit configured to stop the control of causing the phase difference between the arm circuits having the higher efficiency to be larger than the phase difference between the arm circuits having the lower efficiency, based on a change in control current flowing through a control electrode of a switching element constituting any one of the first arm circuit, the second arm circuit, the third arm circuit, and the fourth arm circuit.

8. The power conversion apparatus according to claim 1, wherein
the control unit configured to control the transmitted power without using a switching element having a control electrode through which control current above a reference value flows.

9. The power conversion apparatus according to claim 1, wherein
the power conversion apparatus has a plurality of power supply circuits having the primary side full bridge circuit and the secondary side full bridge circuit in parallel, and the control unit configured to extend the first phase difference and the second phase difference of a power supply circuit having a higher efficiency, and shorten the first phase difference and the second phase difference of a power supply circuit having a lower efficiency.

10. A power conversion method for a power conversion apparatus, the power conversion apparatus including a primary side full bridge circuit having a first arm circuit and a second arm circuit in parallel and a secondary side full bridge circuit having a third arm circuit and a fourth arm circuit in parallel, the power conversion method comprising:
adjusting a first phase difference between switching of the first arm circuit and switching of the third arm circuit and a second phase difference between switching of the second arm circuit and switching of the fourth arm circuit to control transmitted power that is transmitted between the primary side full bridge circuit and the secondary side full bridge circuit,
wherein, among the first phase difference and the second phase difference, the phase difference between the arm circuits having a higher efficiency is caused to be larger than the phase difference between the arm circuits having a lower efficiency.

\* \* \* \* \*